US009877064B2

(12) United States Patent
Bai et al.

(10) Patent No.: US 9,877,064 B2
(45) Date of Patent: Jan. 23, 2018

(54) SYSTEMS AND METHODS FOR EFFICIENT EVENT-BASED SYNCHRONIZATION IN MEDIA FILE TRANSFER AND REAL-TIME DISPLAY RENDERING BETWEEN A PERIPHERAL SYSTEM AND A HOST DEVICE

(71) Applicant: GM GLOBAL TECHNOLOGY OPERATIONS LLC, Detroit, MI (US)

(72) Inventors: Fan Bai, Ann Arbor, MI (US); Dan Shan, Warren, MI (US); Leonard Nieman, Warren, MI (US); Donald K. Grimm, Utica, MI (US); Karen Juzswik, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 12 days.

(21) Appl. No.: 14/808,166

(22) Filed: Jul. 24, 2015

(65) Prior Publication Data

US 2017/0026674 A1 Jan. 26, 2017

(51) Int. Cl.
*H04N 21/4363* (2011.01)
*H04N 21/44* (2011.01)
(Continued)

(52) U.S. Cl.
CPC ... *H04N 21/4302* (2013.01); *H04N 21/41407* (2013.01); *H04N 21/41422* (2013.01);
(Continued)

(58) Field of Classification Search
None
See application file for complete search history.

(56) References Cited

U.S. PATENT DOCUMENTS

| 6,269,120 B1 * | 7/2001 | Boice ............... H04N 21/23406 |
| | | 375/240.12 |
| 2001/0002197 A1 | 5/2001 | Way et al. |

(Continued)

OTHER PUBLICATIONS

SanDisk, http://www.sandisk.com/products/wireless/flash-drive/.
(Continued)

*Primary Examiner* — Michael Telan
(74) *Attorney, Agent, or Firm* — Mickki D. Murray; Parks IP Law LLC

(57) ABSTRACT

A portable system including a digital connection plug, a processing hardware unit, and a non-transitory storage device including code causing the processing hardware unit to perform operations including dividing a received source video file or virtualized source video into a plurality of equal- or non-equal-sized image components. A resulting data-content package is stored at the system such as at a framebuffer thereof. System operations further comprise generating a meta-index package comprising a plurality of index components, each index component corresponding to a respective one of the equal-sized image components, storing the meta-index package, and sending the data-content package and the meta-index package to the host device for publishing of the image components sequentially, in accord with an order of the meta-index package, for display rendering streaming video corresponding to the source video file or virtualized source video.

28 Claims, 5 Drawing Sheets

(51) Int. Cl.
*H04N 21/845* (2011.01)
*H04N 21/43* (2011.01)
*H04N 21/414* (2011.01)

(52) U.S. Cl.
CPC ... *H04N 21/4363* (2013.01); *H04N 21/44004* (2013.01); *H04N 21/8456* (2013.01)

(56) References Cited

U.S. PATENT DOCUMENTS

| | | | |
|---|---|---|---|
| 2004/0123327 A1 | 6/2004 | Fai Ma et al. | |
| 2007/0015486 A1* | 1/2007 | Marlowe | G11B 19/025 |
| | | | 455/345 |
| 2008/0167128 A1* | 7/2008 | Roshak | A63F 13/02 |
| | | | 463/40 |
| 2011/0044210 A1 | 2/2011 | Yokota | |
| 2011/0239078 A1 | 9/2011 | Luby et al. | |
| 2011/0246761 A1 | 10/2011 | Alexandrov | |
| 2011/0257973 A1 | 10/2011 | Chutorash et al. | |
| 2011/0264434 A1* | 10/2011 | Jain | G06F 9/455 |
| | | | 703/22 |
| 2012/0077477 A1 | 3/2012 | Oh | |
| 2012/0179788 A1 | 7/2012 | McGowan | |
| 2014/0052823 A1* | 2/2014 | Gavade | H04N 21/2541 |
| | | | 709/219 |
| 2014/0270161 A1* | 9/2014 | Shamsaasef | H04N 21/4405 |
| | | | 380/44 |
| 2014/0325054 A1 | 10/2014 | Agrawal et al. | |
| 2014/0341026 A1* | 11/2014 | Gahm | H04L 47/76 |
| | | | 370/232 |
| 2014/0380376 A1* | 12/2014 | Schmidt | H04L 65/4084 |
| | | | 725/54 |
| 2015/0086011 A1* | 3/2015 | Kozaczuk | H04N 7/1675 |
| | | | 380/200 |

OTHER PUBLICATIONS

Chromecast, http://www.google.com/chrome/devices/chromecast/.
Microsoft, http://windows.microsoft.com/en-us/windows-8/project-wireless-screen-miracast.

* cited by examiner

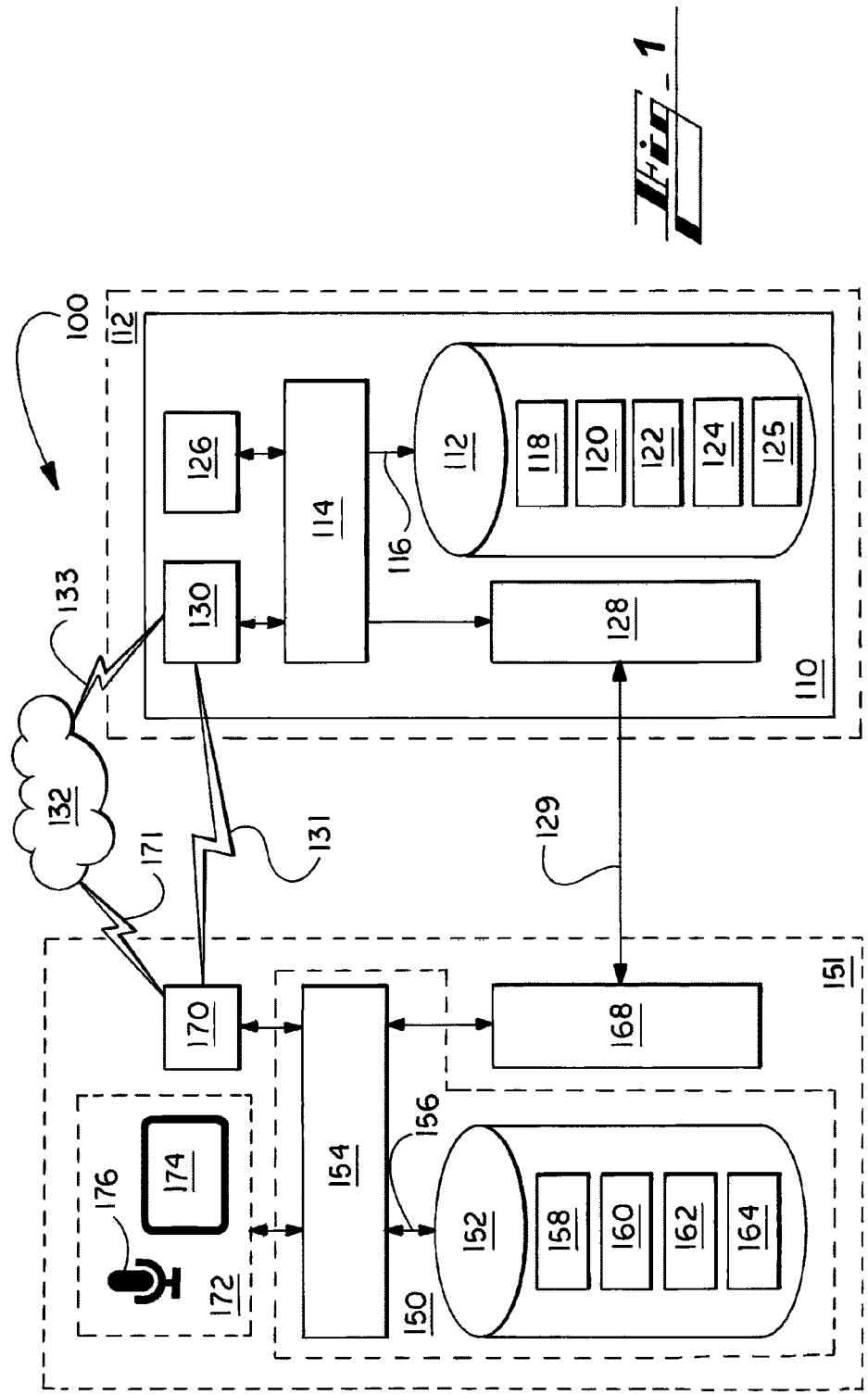

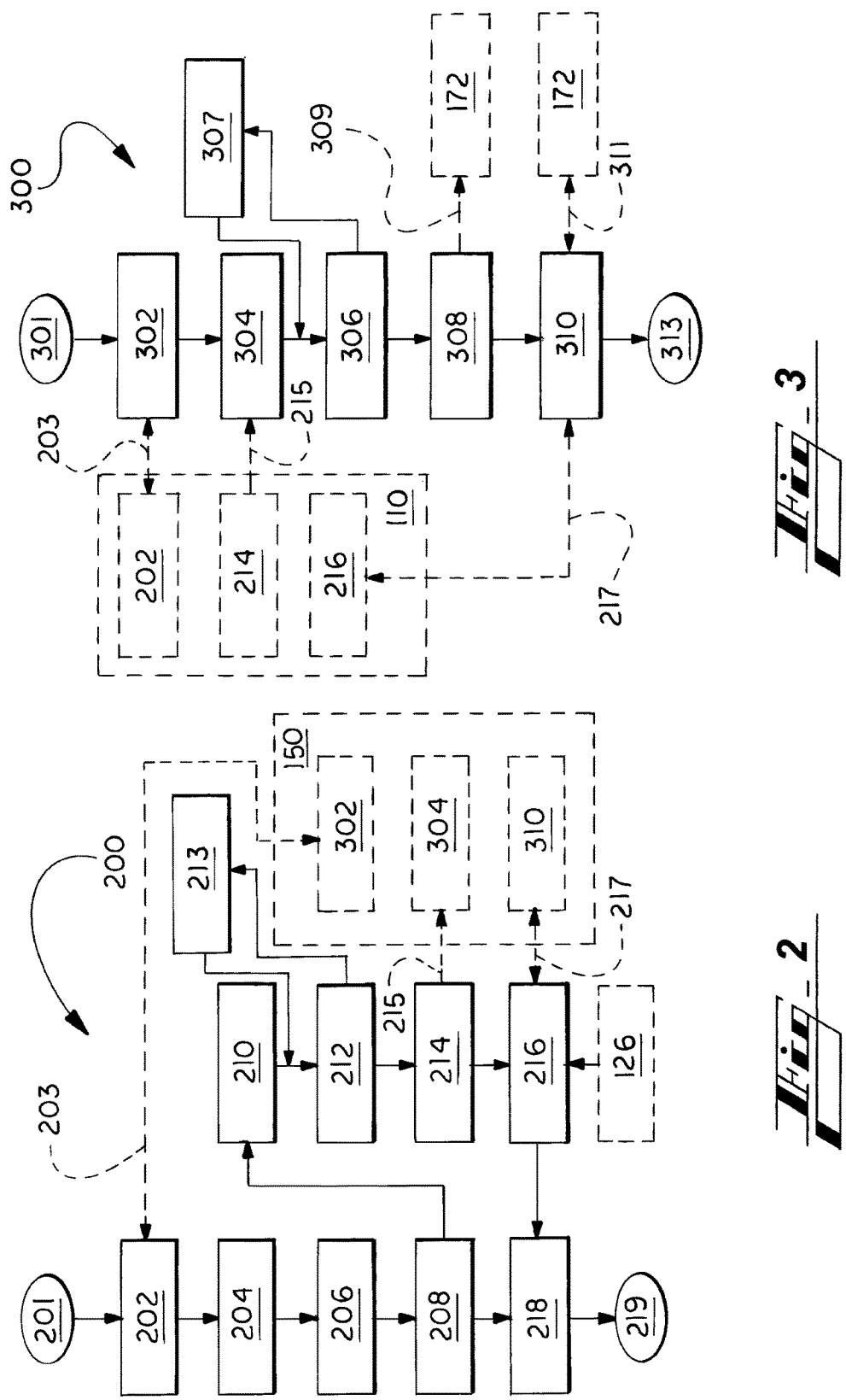

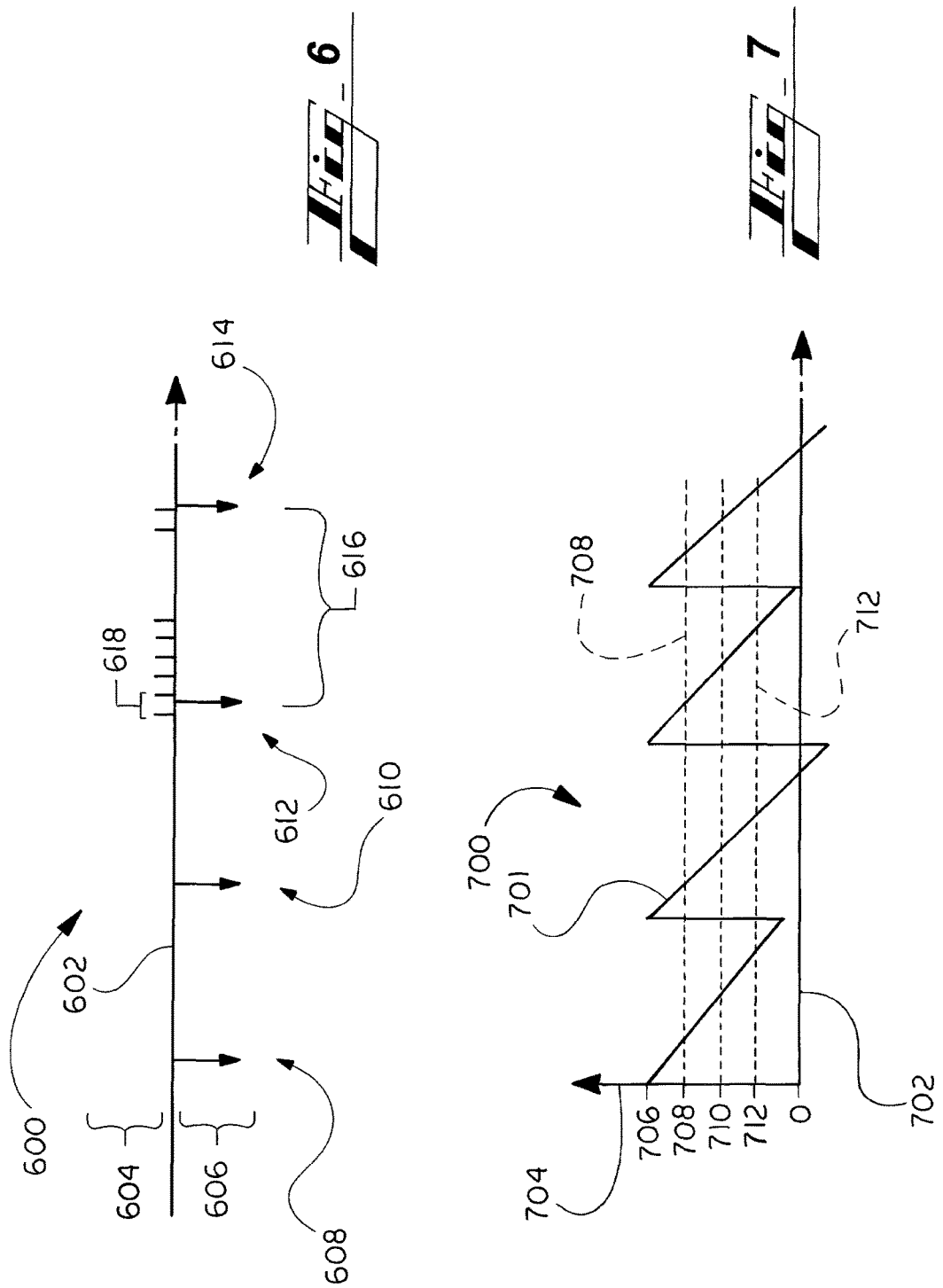

SYSTEMS AND METHODS FOR EFFICIENT EVENT-BASED SYNCHRONIZATION IN MEDIA FILE TRANSFER AND REAL-TIME DISPLAY RENDERING BETWEEN A PERIPHERAL SYSTEM AND A HOST DEVICE

TECHNICAL FIELD

The present disclosure relates generally to synchronized transfer of media content between devices and, more particularly, to synchronizing transfer and real-time display rendering of media such as video streams from a peripheral such as a plug-in mass-storage system to a host device such as an automotive head unit.

BACKGROUND

Most modern automobiles are equipped by original equipment manufacturers (OEMs) with infotainment units that can present media including visual media. The units can present audio received over the Internet by way of an audio application running at the unit, for instance, and present video received from a digital video disc (DVD), for instance. While many units can also present visual media such as navigation and weather information received from a remote source, presenting video received from a remote source remains a challenge.

Other display devices or components, such as televisions and computer monitors, can receive video data by way of a high-throughput, or high-transfer-rate interface such as a High-Definition Multimedia Interface (HDMI) or Video Graphics Array (VGA) port. (HDMI is a registered trademark of HDMI Licensing, LLC, of Sunnyvale, Calif.) Digital media routers have been developed for plugging into these high-transfer-rate ports for providing video data to the display device.

Most host devices, such as legacy automobiles already on the road, do not have these high-transfer-rate interfaces. Increasingly, modern vehicles have a peripheral port, such as a universal-serial-bus (USB) port, or a wireless receiver for use in transferring only receiving relatively low-transfer-rate data from a mobile user device such as a smart phone.

Transferring video data efficiently and effectively by way of a lower-transfer-rate connection, such as USB remains a challenge. Streaming video data conventionally requires high data rates. While HDMI data rates can exceed 10 Gbps, USB data rates do not typically exceed about 4 Gbps.

Barriers to transferring video data efficiently and effectively from a remote source to a local device for display also include limitations at the local device, such as limitations of legacy software and/or hardware at the local device. Often, the mobile user devices do not have a video card and/or the vehicles do not have graphics-processing hardware. And, for example, USB video class (UVC) is not supported by either commercial Android® devices or prevailing infotainment systems. (ANDROID is a registered trademark of Google, Inc., of Mountain View, Calif.)

Another barrier to transferring video data from a remote source to a local display is a high cost of hardware and software required to time-synchronize transmissions between devices to avoid read-write conflict.

SUMMARY

There is a need for an arrangement for transferring high-speed video streams in an efficient and synchronized manner between connected devices with low latency, and without expensive time-synchronization components.

There is also a need for systems that can transfer high-speed video streams, such as video for streaming at a receiving device, by way of a relatively low-rate connection such as a USB connection.

The present technology solves these and other challenges related to transferring high-throughput media from a source, such as a remote application server, to a destination host device, such as an automobile head unit.

The present technology processes data having file format, and the result is a novel manner of streaming video and audio. The data being processed at any time includes a volume of still images. The still-image arrangement involving the volume, e.g., thousands, of still images, facilitates delivery of high-speed streaming video, with low latency. The process includes flushing a cache. The implementation includes use of a plug-in mass-storage system, such as one using a USB mass storage class (USB MSC) protocol.

The disclosure presents systems for synchronizing transfer and real-time display of high-throughput media, such as streaming video, between a peripheral, such as a USB plug-in mass-storage system, and a destination host device. The media is synchronized in a novel, event-based manner that obviates the need for expensive clock-based synchronization components.

In one aspect, the present disclosure relates to a portable system comprising a processing hardware unit and a non-transitory storage device comprising computer-executable code that, when executed by the processing hardware unit, causes the processing hardware unit to perform various operations of the current technology. The portable system can be referred to by terms such as peripheral, travel system, mobile system, travel or mobile companion, portable device, or the like, by way of example.

The portable system is configured to receive a source streaming video—e.g., video file—from a video source, such as a remote video source (e.g., server), and dividing the source streaming video into a plurality of equal- or non-equal-sized image components. A resulting data-content package is stored at the system such as at a framebuffer thereof. The framebuffer can be, for instance, a transferred video source, such as in the form of a data content package.

The portable system is further configured to generate a meta-index package comprising a plurality of index components, each index component corresponding to a respective one of the equal- or non-equal-sized image components. The portable system is also configured to store the meta-index package to the non-transitory storage device. The operations further comprise sending the data-content package and the meta-index package to the host device for publishing of the image components sequentially, in accord with an order of the meta-index package, for display rendering streaming video, corresponding to the source streaming video, by way of the host device and a display device. This arrangement, involving transfer and real-time display of the data-content package and the meta-index package corresponding thereto can be referred to as a multi-tiered arrangement.

In some embodiments, the portable system and the host device are configured for bidirectional communications between them. Instructions or data between the two can be sent by way of a forward channel from the portable system to the host device, and by way of a back channel from the host device back to the portable system. Instructions or data can be configured to change a setting or function of the receiving device or system, for instance. In some implementations, the portable system, host device, and communication channel connecting them are configured to allow simultaneous bidirectional communications. In various embodiments, the configuration is arranged to facilitate the communications according to a time-division-multiple access (TDMA) channel-access method.

In some embodiments, the portable system includes a human-machine interface (HMI), such as a button or microphone. The portable system is configured to receive user input by way of the HMI, and trigger any of a variety of actions, including establishing a user preference, altering a preference previously established preference, and generating an instruction for sending to the host device.

In various embodiments, the portable system and the host device comprise a computer-executable code in the form of a dynamic programming language to facilitate interactions between the portable system and the host device.

The portable system in some embodiments uses a first-level cache to store the image components formed. The mentioned framebuffer can be a part of the first-level cache, for instance.

In some embodiments the host system is configured for implementation as a part of a vehicle of transportation, such as an automobile comprising a communication port and a display screen device mentioned. The portable system can in this case include a communication mass-storage-device-class computing protocol (e.g., USB MSC protocol) for use in communications between the portable system and a processing hardware unit of the host device. An instruction from the host device to the portable system can be configured to affect portable system operations, such as a manner by which the source video is divided to form the indexed image component.

Other aspects of the present invention will be in part apparent and in part pointed out hereinafter.

DESCRIPTION OF THE DRAWINGS

FIG. 1 illustrates schematically an environment in which the present technology is implemented, including a portable system and a host device.

FIG. 2 illustrates operations of an algorithm programmed at the portable system of FIG. 1.

FIG. 3 illustrates operations of an algorithm programmed at the host device of FIG. 1.

FIG. 6 shows a chart indicating an event-based timing by which circular files are written and read.

FIG. 7 shows a graph corresponding to the chart of FIG. 6, showing an amount by which consecutive circular files are read over time before a next file is written.

Figure 4:
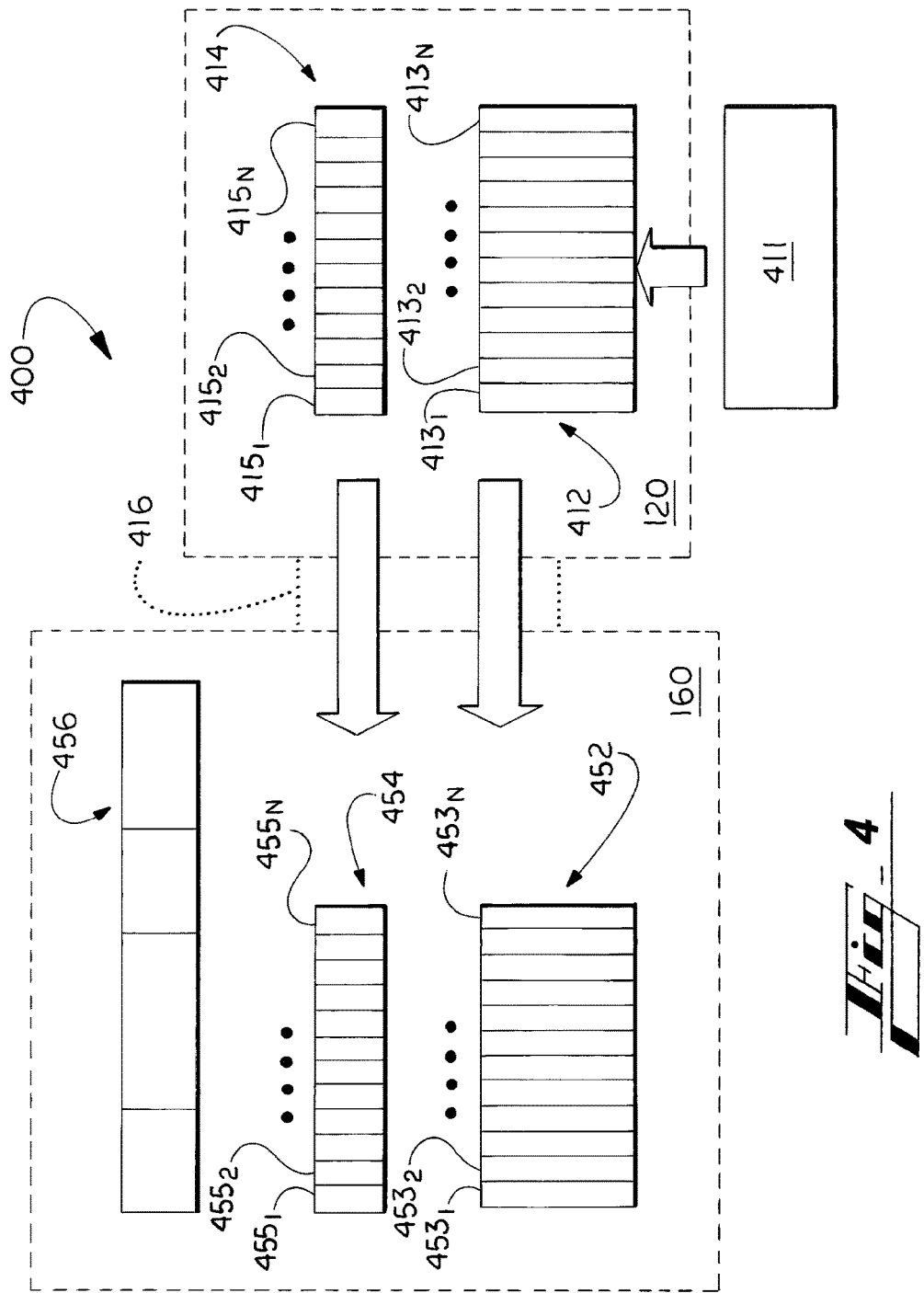
FIG. 4 illustrates schematically a circular framebuffer transfer and real-time display process, synchronized by a multi-tiered, event-based, arrangement.

The figures are not necessarily to scale and some features may be exaggerated or minimized, such as to show details of particular components. In some instances, well-known components, systems, materials or methods have not been described in detail in order to avoid obscuring the present disclosure.

In the figures, like numerals are used to refer to like features.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model, or pattern.

Specific structural and functional details disclosed herein are not to be interpreted as limiting, but merely as a basis for the claims and as a representative basis for teaching one skilled in the art to employ the present disclosure.

While the present technology is described primarily herein in connection with automobiles, the technology is not limited to automobiles. The concepts can be used in a wide variety of applications, such as in connection with aircraft and marine craft, and non-transportation industries such as with televisions.

Other non-automotive implementations can include plug-in peer-to-peer, or network-attached-storage (NAS) devices.

I. FIG. 1—TECHNOLOGY ENVIRONMENT

FIG. 1 illustrates schematically an arrangement or environment 100 in which the present technology is implemented. The environment 100 includes a portable apparatus, system, or device 110 and a host apparatus, system, or device 150. For clarity, and not to limit scope, the portable apparatus 110 is referred to primarily herein as a portable system, and the host apparatus 150 as a host device. In some embodiments, the portable system and host device 110, 150 are a consolidated system 100.

The portable system 110 can take any of a variety of forms, and be referenced in any of a variety of ways—such as by peripheral device, peripheral system, portable peripheral, peripheral, mobile system, mobile peripheral, portable system, and portable mass-storage system.

The portable system 110 can be portable based on being readily removable, such as by having a plug-in configuration, for example, and/or by being mobile, such as by being configured for wireless communications and being readily carried about by a user. The portable system 110 can include a dongle, or a mobile communications device such as a smart phone, as just a couple examples.

Although connections are not shown between all of the components of the portable system 110 and of the host device 150 in FIG. 1, the components can interact with each other in any suitable manner to carry out system functions.

The portable system 110 includes a non-transitory hardware storage device 112. The hardware storage device 112 can be referred to by other terms, such as a memory, or computer-readable medium, and can include, e.g., volatile medium, non-volatile medium, removable medium, and non-removable medium. The term hardware storage device and variants thereof, as used in the specification and claims, refer to tangible or non-transitory, computer-readable storage devices. The component is referred to primarily herein as a hardware storage device 112, or just a storage device 112 for short.

In some embodiments, the storage device 112 includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The portable system 110 also includes a processing hardware unit 114 connected or connectable to the hardware storage device 112 by way of a communication link 116, such as a computer bus.

The processing hardware unit 114 can be referred to by other terms, such as computer processor, just processor, processing hardware unit, processing hardware device, processing hardware system, processing unit, processing device, or the like.

The processor 114 could be or include multiple processors, which could include distributed processors or parallel processors in a single machine or multiple machines. The processor 114 can include or be a multicore unit, such as a multicore digital signal processor (DSP) unit or multicore graphics processing unit (GPU).

The processor 114 can be used in supporting a virtual processing environment. The processor 114 could include a state machine, application specific integrated circuit (ASIC), programmable gate array (PGA) including a Field PGA (FPGA), DSP, GPU, or state machine. References herein to processor executing code or instructions to perform operations, acts, tasks, functions, steps, or the like, could include the processor 114 performing the operations directly and/or facilitating, directing, or cooperating with another device or component to perform the operations.

The portable system 110 in various embodiments comprises one or more complimenting media codec components, such as a processing or hardware component, and a software component to be used in the processing. The hardware or processing component can be a part of the processing device 114.

The hardware storage device 112 includes computer-executable instructions or code 118. The hardware storage device 112 in various embodiments stores at least some of the data received and/or generated, and to be used in processing, in a file-based arrangement corresponding to the code stored therein. For instance, when an FPGA is used, the hardware storage device 112 can include configuration files configured for processing by the FPGA.

The computer-executable code 118 is executable by the processor 114 to cause the processor 114, and thus the portable system 110, to perform any combination of the functions described herein regarding the portable system.

The hardware storage device 112 includes other code or data structures, such as a file sub-system 120, and a framebuffer capture component 122.

As mentioned, the portable system 110 in various embodiments comprises one or more complimenting media codec components, such as a processing, or hardware component, and a software component to be used in the processing. The software media codec component is indicated by reference numeral 124.

As also mentioned, a framebuffer can be a transferred video source, such as in the form of a data content package, captured by the framebuffer capture component 122.

The file sub-system 120 can include a first level cache and in some implementations also a second level cache.

In some embodiments, the hardware storage device 112 includes code of a dynamic programming language 125, such as JavaScript, Java or a C/C++ programming language. The host device 150 includes the same programming language, which is indicated in FIG. 1 by reference numeral 164. The component 164 of the host device 150 in some implementations includes an application framework, such as the media application mentioned and/or an application manager for managing operations of the media application at the host device 150.

The programming language code can define settings for communications between the portable system 110 and the host device 150, such as parameters of one or more application program interfaces (APIs) by which the portable system 110 and the device 150 communicate.

The portable system 110 in some embodiments includes at least one human-machine interface (HMI) component 126. For implementations in which the interface component 126 facilitates user input to the processor 114 and output from the processor 114 to the user, the interface component 126 can be referred to as an input/output (I/O) component. As examples, the interface component 126 can include, or be connected to a sensor for receiving user input, and include or be connected to a visual or audible indicator such as a light, digital display, or tone generator, for communicating output to the user.

The interface component 126 is connected to the processor 114 for passing user input received as corresponding signals to the processor. The interface component 126 is configured in any of a variety of ways to receive user input. In various implementations the interface component 126 includes at least one sensor configured to detect user input provided by, for instance, a touch, an audible sound or a non-touch motion or gesture.

A touch-sensor interface component can include a mechanical actuator, for translating mechanical motion of a moving part such as a mechanical knob or button, to an electrical or digital signal. The touch sensor can also include a touch-sensitive pad or screen, such as a surface-capacitance sensor.

For detecting gestures, the interface component 126 can include or use a projected-capacitance sensor, an infrared laser sub-system, a radar sub-system, or a camera sub-system, by way of examples.

The interface component 126 can be used to affect functions and settings or parameters of one or both of the portable system 110 and the host device 150 based on user input. Signals or messages corresponding to inputs received by the interface component 126 are transferred to the processor 114, which, executing code (e.g., code 118) of the hardware storage device 112, sets or alters a function at the portable system 110. Inputs received can also trigger generation of a communication, such as an instruction or message, for the host device 150, and sending the communication to the host device 150 for setting or altering a function of the device 150.

The portable system 110 is in some embodiments configured to connect to the host device 150 by hard, or wired connection 129. Such connection is referred to primarily herein as a wired connection in a non-limiting sense. The connection can include components connecting wires, such as the USB plug-and-port arrangement described.

In some other embodiments, the connection is configured with connections according to higher throughput arrangements, such as using an HDMI port or a VGA port.

The portable system 110 is in a particular embodiment configured as a dongle, such as by having a data-communications plug 128 for connecting to a matching data-communications port 168 of the host device 150, as indicated in FIG. 1. As provided, the portable system 110 is in some embodiments a portable mass-storage system. The portable system 110 is configured in various embodiments to operate any one or more of a variety of types of computer instructions that it may be programmed with for dynamic operations and/or that it may receive for dynamic processing at the system 110.

An example data-communications plug 128 is a USB plug, for connecting to a USB port of the host device 150.

In some embodiments, the portable system 110 is configured for wireless communications with the host device 150 and/or a system 132 external to the portable system 110, such as a remote network or database. A wireless input or input/output (I/O) device—e.g., transceiver—or simply a transmitter, is referenced by numeral 130 in FIG. 1. Wireless communications with the host device 150 and external system 132 are referenced by numerals 131, 133, respectively.

The wireless device 130 can communicate with any of a wide variety of networks, including cellular communication networks, satellite networks, and local networks—e.g., roadside-infrastructure or other local-wireless transceivers, beacons or hotspots. The wireless device 130 can also communicate with near-field communication (NFC) devices to support functions such as mobile payment processing, or communication setup/handover functions, or any other use cases that are enabled by NFC. The wireless device 130 can include, for example, a radio modem for communication with cellular communication networks.

The remote system 132 can thus in various embodiments include any of cellular communication networks, road-side infrastructure or other local networks, for reaching destinations such as the Internet and remote servers. The remote server may be a part of or operated by a customer-service center or system, such as the OnStar® system (ONSTAR is a registered trademark of Onstar LLC of Detroit, Mich.).

Other features and functions of the portable system 110 are described below, primarily in connection with the algorithm of FIG. 2.

The host device 150 is, in some embodiments, part of a greater system 151, such as an automobile.

As shown, the host device 150 includes a hardware storage device 152. The hardware storage device 152 can be referred to by other terms, such as a memory, or computer-readable medium, and can include, e.g., volatile medium, non-volatile medium, removable medium, and non-removable medium. The term hardware storage device and variants thereof, as used in the specification and claims, refer to tangible or non-transitory, computer-readable storage devices. The component is referred to primarily herein as a hardware storage device 152, or just a storage device 152 for short.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The host device 150 also includes an embedded computer processor 154 connected or connectable to the storage device 152 by way of a communication link 156, such as a computer bus.

The processor 154 can be referred to by other terms, such as processing hardware unit, processing hardware device, processing hardware system, processing unit, processing device, or the like.

The processor 154 could be or include multiple processors, which could include distributed processors or parallel processors in a single machine or multiple machines. The processor 154 can include or be a multicore unit, such as a multicore digital signal processor (DSP) unit or multicore graphics processing unit (GPU).

The processor 154 can be used in supporting a virtual processing environment. The processor 154 could include a state machine, application specific integrated circuit (ASIC), programmable gate array (PGA) including a Field PGA (FPGA), DSP, GPU, or state machine. References herein to processor executing code or instructions to perform operations, acts, tasks, functions, steps, or the like, could include the processing device 154 performing the operations directly and/or facilitating, directing, or cooperating with another device or component to perform the operations.

The hardware storage device 152 includes computer-executable instructions or code 158. The hardware storage device 152 in various embodiments stores at least some of the data received and/or generated, and to be used in processing, in a file-based arrangement corresponding to the code stored therein. For instance, when an FPGA is used, the hardware storage device 112 can include configuration files configured for processing by the FPGA.

The storage device 152 includes computer-executable instructions, or code 158. The computer-executable code 158 is executable by the processor 154 to cause the processor, and thus the host device 150, to perform any combination of the functions described in the present disclosure regarding the host device 150.

The host device 150 includes other code or data structures, such as a file sub-system 160, a dynamic-programming-language application framework 162, such as JavaScript, Java or a C/C++ programming language.

The file sub-system 160 can include a first level cache and a second level cache. The file sub-system 160 can be used to store media, such as video or image files, before the processor 154 publishes the file(s).

The dynamic-programming-language (e.g., JavaScript, Java or a C/C++ programming language) application framework 162 can be part of the second level cache. The dynamic-programming-language is used to process image data received from the portable system 110. The programming language code can define settings for communications between the portable system 110 and the host device 150, such as parameters of one or more APIs.

The host device 150 includes or is in communication with one or more interface components 172, such as an HMI component. For implementations in which the components 172 facilitate user input to the processor 154 and output from the processor 154 to the user, the components can be referred to as input/output (I/O) components.

For output, the interface components 172 can include a display screen 174, which can be referred to as simply a display or screen, and an audio output such as a speaker. In a contemplated embodiment, the interface components 172 include components for providing tactile output, such as a vibration to be sensed by a user (e.g., an automobile driver), such as by way of a steering wheel or vehicle seat.

The interface components 172 are configured in any of a variety of ways to receive user input. The interface components 172 can include for input to the host device 150, for instance, a mechanical or electro-mechanical sensor device such as a touch-sensitive display, which can be referenced by numeral 174, and/or an audio device 176 such as an audio sensor—e.g., microphone—or audio output such as a speaker. In various implementations, the interface components 172 includes at least one sensor. The sensor is configured to detect user input provided by, for instance, touch, audibly, and/or by user non-touch motion, e.g., by gesture.

A touch-sensor interface component can include a mechanical actuator, for translating mechanical motion of a moving part such as a mechanical button, to an electrical or digital signal. The touch sensor can also include a touch-sensitive pad or screen, such as a surface-capacitance sensor. For detecting gestures, an interface component 172 can use a projected-capacitance sensor, an infrared laser sub-system, a radar sub-system, or a camera sub-system, for example.

The interface component 172 can be used to affect functions and setting or parameters of the one or both of the portable system 110 and the host device 150 based on user input. Signals corresponding to inputs received by the interface component 172 are passed to the processor 154, which, executing code of the storage device 152, sets or alters a function at the host device 150, or generates a communication for the portable system 110, such as an instruction or message, and sends the communication to the portable system 110 for setting or altering the function of the portable system 110.

The host device 150 is in some embodiments configured to connect to the portable system 110 by the wired connection 129 mentioned. The host device 150 is in a particular embodiment configured with, or connected to a data-communications port 168 matching the data-communications plug 128 of the portable system 110 for communicating by way of the wired link 129. An example plug/port arrangement provided is the USB arrangement mentioned.

As provided, the connection is in some other embodiments configured with connections according to higher throughput arrangements, such as using an HDMI port or a VGA port.

In some embodiments, the host device 150 is configured for wireless communications 131 with the portable system 110. A wireless input, or input/output (I/O) device—e.g., transceiver—is referenced by numeral 170 in FIG. 1. The processor 154, executing code of the storage device 152, can wirelessly send and receive information, such as messages or packetized data, to and from the portable system 110 and the remote system 132, by way of the wireless input, or I/O device 170 as indicated by numerals 131, 171, respectively.

Other features and functions of the host device 150 are described below, primarily in connection with the algorithm of FIG. 3.

II. FIGS. 2-5—ALGORITHMS AND FUNCTIONS

The algorithms by which the present technology is implemented are now described in more detail. The algorithms are outlined by flow charts arranged as methods 200, 300 in FIGS. 2 and 3.

Figure 5:
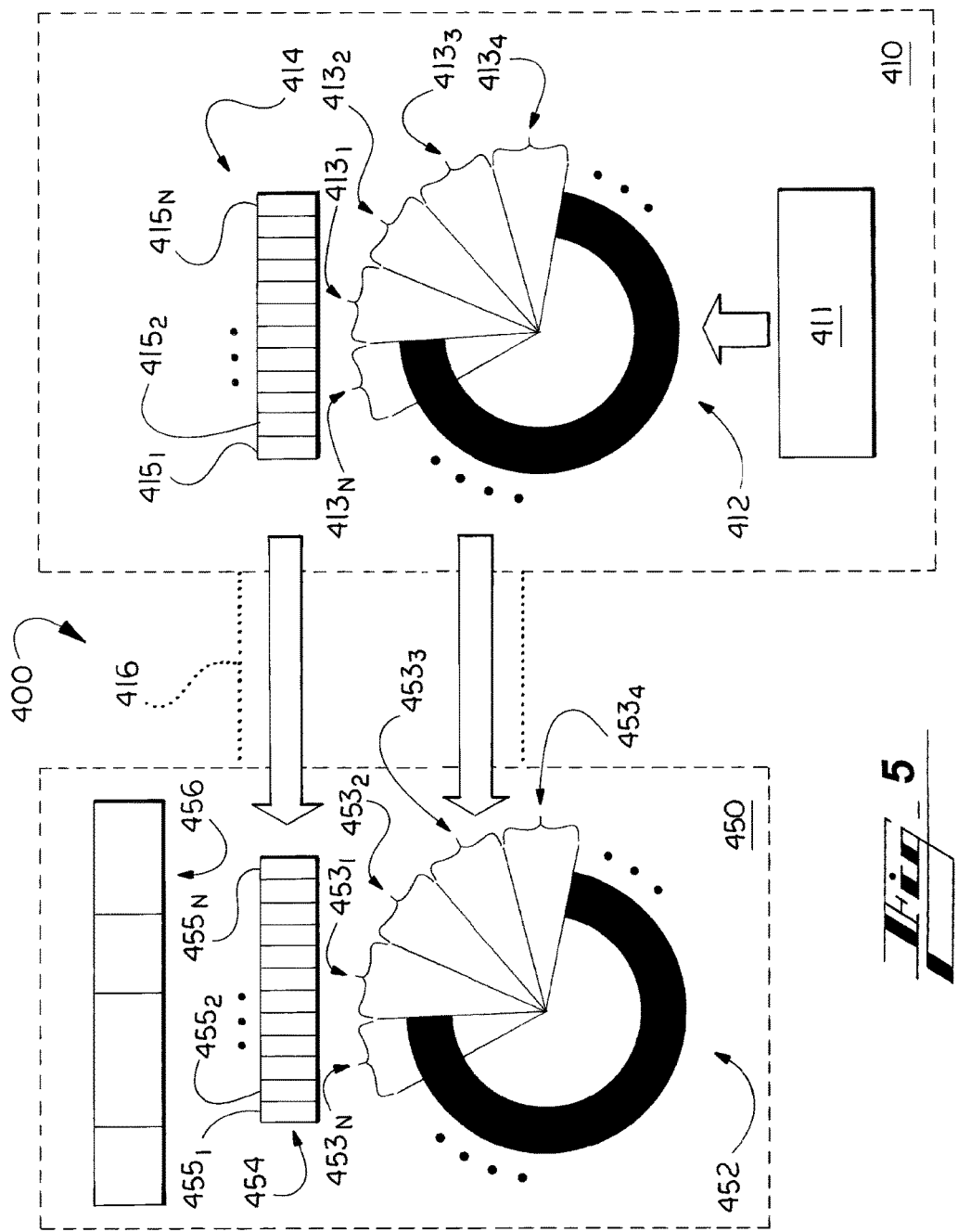
FIG. 5 shows an alternative view of the arrangement of FIG. 4, in a manner emphasizing a circular nature of the arrangement.

FIG. 2 illustrates operations of an algorithm programmed at the portable system 110 of FIG. 1. FIG. 3 illustrates operations of an algorithm programmed at the host device 150 of FIG. 1. FIG. 4 shows schematically a circular framebuffer arrangement 400 between respective file sub-systems 120, 160 of the portable system 110 and the host device 150. And FIG. 5 shows an alternative view of the same arrangement as that of FIG. 4, in a manner emphasizing a circular nature of the arrangement.

It should be understood that operations of the methods 200, 300 are not necessarily presented in a particular order and that performance of some or all the operations in an alternative order is possible and contemplated.

The operations have been presented in the demonstrated order for ease of description and illustration. Operations can be added, omitted and/or performed simultaneously without departing from the scope of the appended claims.

It should also be understood that the illustrated algorithms 200, 300 can be ended at any time. In certain embodiments, some or all operations of this process, and/or substantially equivalent operations are performed by execution by the processors 114, 154 of computer-executable code of the storage devices 112, 152 provided herein.

II.A. PORTABLE SYSTEM OPERATIONS—FIGS. 2 AND 4

The algorithm 200 of FIG. 2 is described primarily from the perspective of the portable system 110 of FIG. 1.

The algorithm 200 commences 201 and flow proceeds to the first operation 202 whereat the portable system 110—i.e., the processor 114 thereof executing code stored at the system storage 112—is placed in communication with the host device 150. Connecting with the host device 150 can include connecting by wire 129 (e.g., plug/port and wires) or wirelessly 131, as described above in connection with the arrangement 100 of FIG. 1. Example host devices 150 include a head unit, or an on-board computer, of a transportation vehicle, such as an automobile.

The portable system 110 is in some embodiments configured to connect to the host device 150 by wired connection, referenced by numeral 129 in FIG. 1 and also by numeral 203 in FIG. 2. Corresponding activity of the host device 150 for this interaction 202 is described further below in connection with FIG. 3, and particularly block 302 of FIG. 3.

FIG. 4 shows aspects of the respective file sub-systems 120, 160 of the portable system 110 and the host device 150.

The portable system 110 is in a particular embodiment configured as a dongle, such as by having a data-communications plug 128—e.g., USB plug—for connecting to a matching port 168 of the host device 150. For communications between the portable system 110 and the host device 150, each can include in their respective storage devices 112, 512, a protocol operable with the type of connection. With the USB plug/port example, the protocol can be a USB mass-storage-device-class (MSC) computing protocol. Other, more advanced, USB or other, protocols, including Media Transfer Protocol (MTP), could also be supported.

The portable system 110 is in some embodiments configured to connect to the host device 150 by wireless connection, referenced by numeral 131 in FIG. 1, and also by numeral 203 in FIG. 2.

The portable system 110 connected communicatively with the host device 150 performs a handshake process with the host device 150, which can also be considered indicted by reference numeral 203 in FIG. 2.

Operation 202 establishes a channel by which data and communications such as messages or instructions can be shared between the portable system 110 and the host device 150.

For embodiments in which both devices include a dynamic programming language, such as JavaScript, the operation 202 can include a handshake routine between the portable system 110 and the host device 150 using the dynamic programming language.

Flow proceeds to block 204 whereat the processor 114 receives, e.g., by way of the wireless communication component 130, a source media file, such as streaming video, from a source, such as a remote video source. The remote source can include a server of a customer-service center or system, such as a server of the OnStar® system.

Turning to FIG. 4, the data content is received from a source such as a framebuffer 411.

In various embodiments, the source media file referenced is a virtual file, such as in the form of a link or a pointer linked to a memory location containing particular corresponding media files, or a particular subset of the media files.

While the technology can be used to transfer and display render in real time—e.g., render for displaying or display purposes—various types of media files, including those with or without video, and with or without audio, the type of file described primarily herein is a video file representing a graphic output, or data for being output as a corresponding graphical display at a display screen, which in various embodiments does and does not include audio. References in the present disclosure to streaming video, video files, or the like, should for various embodiments be considered to also refer to like embodiments that include any of the various media file types possible.

The operation can include receiving the media—e.g., file—in one piece, or receiving separate portions simultaneously or over time.

In a contemplated embodiment, the video file is received from a local source, such as a virtual video file linked to the framebuffer or associated in the system—e.g., system memory—with the display screen. In embodiments, a primary, if not sole, video source is the framebuffer.

The local source can include, for instance, a smart phone or other mobile device that either receives the video file from a remote source and passes it on to the portable system 110, or has the video stored at the local source. Transfer from the local source to the portable system 110 can be by wire or wireless.

In various embodiments the video stream has any of a variety of formats, such as .mpeg, .wmv, or .avi formats, just by way of example.

Flow proceeds to block 206 whereat the processor 114 divides the source video stream, or other visual media file(s), into a plurality of indexed image components—e.g., consecutively-ordered image components. In various embodiments the image components have any of a variety of formats, such as a .jpeg format for example.

While the image components for various implementations are equal-sized, in other implementations, every image component is not the same size.

As mentioned, the portable system 110 in some embodiments has, in the hardware storage device 112, code of a dynamic programming language 125, such as JavaScript, Java or a C/C++ programming language. The language can be used in system 110 operations including image-processing operations such as the present function of dividing the video stream—e.g., video file—into consecutive image components.

The image components together can be referred to as a data-content package.

The number (N) of image components can be any in a wide range. Only by way of example, the number (N) can be in the range of about 2,500 to about 3,500. In contemplated embodiments, the number (N) is less than 2,500 or above 3,500.

In various embodiments, at block 208, the processor 114 stores the data-content package 412 (FIGS. 4, 5) to a portion of memory 112 at the portable system 110, such as to a circular buffer, referenced in FIG. 5 by numeral 412. In this case, the framebuffer 122 can act more as a local content source rather than as a destination.

Turning again to FIG. 4, wherein the data content is indicated by reference numeral 412, and the constituent image components are referenced by numerals $413_1$-$413_N$. The package 412 is stored in a first level cache of the portable system 110. FIG. 5 shows the same arrangement as that in FIG. 4 in a different format, emphasizing the circular-file aspects of the arrangement.

In a contemplated embodiment, the processor 114 at block 208 stores the data-content package 412 (FIGS. 4, 5) to the framebuffer, or framebuffer capture component, referenced in FIG. 1 by numeral 122. In this alternative case, the framebuffer 122 acts more as a buffer or local destination before the data is processed further and transferred to the host device.

At block 210, the processor 114 generates a meta-index package 414 (FIGS. 4 and 5) comprising a plurality of meta index components $415_1$-$415_N$. Each meta index component 415 corresponds to a respective one of the image components 413. Each meta index component 415 is configured to refer, or point, to its corresponding image component 413. The first meta index component $415_1$ indicates or points to the first image component $413_1$, the second meta index component $415_2$ indicates the second image component $413_2$, and so on. The meta index components 415 thus number (N) like the image components 413.

The meta index components 415 can be the same as or similar to directory entry structures, such as that of a file allocation table (FAT) system.

At block 212, the processor 114 stores the meta index 414 at the portable system 110. The meta index 414 is also stored at the first level cache of the portable system 110.

As provided, operations of the method 200 can be performed in any order, and operations can be combined to a single step, or separated into multiple steps. Regarding the generating operations 206, 210 and storing operations 208, 212, for instance, the generating operations and/or the storing can be performed in respective single steps. The portable system 110 can store the data-content package 412 and the meta-index package 414 to the hardware storage device 112, in single operation, for instance. And the packages 412, 414 can be part of the same packet, stream, or file, or stored or transferred to the host device 150 separately.

In some embodiments, the operations include one or more real-time adjustment functions, referenced by numeral 213 in FIGS. 2 and 307 in FIG. 3. In the operation at block 213, the processor 114, executing system code, adjusts or manipulates a linkage relationship between the data-content package and the meta-index package in real time at the host system. The host device 150 can perform a similar real-time adjustment, at block 307, in addition to or instead of such adjustment at the portable system 110 at block 213. In various embodiments, a linkage relationship between the data-content package and the meta-index package is adjusted in real time at the remote portable system.

As an example of what the adjustment function can include, the adjustment can change particular image content that is associated with a particular meta index. For determining how to adjust the linkage, the processor 114 can use as input its local clock and local copy of the physical address of the video stream. By doing so, static content represented by, for instance, USB mass storage protocol, becomes dynamic, and real-time video streaming through USB mass storage protocol is realized. Benefits of this manipulation include rendering dynamic screen output without requiring advanced classes of USB devices. The process can thus be applied with a much broader range of devices having basic USB mass storage capabilities.

At block 214, the processor 114 sends the data-content package 412 and corresponding meta-index package 414 to the host device 150. The transfer is referenced by reference numeral 215 in FIG. 2. Corresponding activity of the host device is described further below in connection with FIG. 3, and particularly at block 304 there.

The data-content package 412 and corresponding meta-index package 414 can be sent in a single communication or transmission, or by more than one communication or transmission. The mechanism is referred to at times herein as a packet, stream, file, or the like, though it may include more than one packet or the like.

In one embodiment, each image-component/meta-index-component pair is sent by the processor 114 to the host device 150 individually, in separate transmissions, instead of in packages 412, 414 with other image component/meta index component pairs. This embodiment can be referred to as a single-image file arrangement or management, by way of example.

In a contemplated embodiment, the portable system 110 is configured to determine in real time which of the circular file arrangement and the single-file arrangement to use. This type of determination can be referred to by any of various terms, such as dynamic, real-time, or adaptive—e.g., dynamic selection amongst framebuffering algorithms or techniques. Variables for the determination can include, for instance, one or more characteristics of the media—e.g., video—received for processing (e.g., dividing, storing, and sending). The variable could also include an identification of a relevant application running at the host device 150 to publish the resulting video, a category to which the application belongs, a type of application, or the like.

These arrangements (including circular file and single file arrangements), involving transfer of one or more components of data content at a time and one or more corresponding components of meta index, can be referred to as a multi-tiered arrangement, the meta index features being a first tier corresponding to a second tier of image data features.

The packet(s) is configured and sent to the host device 150 for publishing of the image components sequentially, in accord with an order of the meta-index package. The host device 150 publishes the image components to display render streaming video, corresponding to the original, source video stream, by way of the host device 150 and a display device 174.

An efficient and effective type of synchronization, not requiring synchronized clocks, is provided by this arrangement of sending a meta index 414 of meta index components 415 corresponding in order to image components 413 of a data-content package 412 for sequential display rendering of the image components 413 in accord with the index components 415.

The processing, or reading, of each image component is triggered by the reading first of the corresponding meta index component. Each next index component (e.g., $415_2$) is read following processing of a prior image component (e.g., $413_1$), and points the processor 154 to read its corresponding image component (e.g., $413_2$). The synchronization can be referred to as event-based synchronization, whereby none of the image components will be processed out of order. The event-based synchronization obviates the need for expensive clock or time synchronization components.

The synchronization can also be referred to as distributed device synchronization, as it involves functions of both devices, working together: the generating and sending of the index/data packages according to the present technology at the portable system 110, and the receiving and ordered display rendering of the packages at the host device 150.

The process 200 or portions thereof can be repeated, such as in connection with a new stream or file associated with a new video, or with subsequent portions of the same video used to generate the first image components and meta index components. The subsequent operations would include preparing a second data-content package and corresponding second meta-index package in the ways provided above for the first packages.

As referenced, the portable system 110 and the host device 150 can further be configured for simultaneous bidirectional communications. The two-way communications can, in some implementations, be made simultaneously. As provided, in various embodiments, the configuration is arranged to facilitate the communications according to the TDMA channel-access method.

Each of the portable system 110 and the host device 150 can also be configured for multiplexing, inverse multiplexing, and the like to facilitate efficient and effective transfer and real-time display of relatively high-throughput data between them.

The transfer 215 of previous operation 214 can be considered made by way of a first, or forward, channel of the bidirectional arrangement by which data is sent from the portable system 110 to the host device 150.

At operation 216, the portable system 110 generates, identifies (e.g., retrieves), receives, or otherwise obtains instructions or messages, such as orders or requests for changing of a setting or function. For instructions for adjusting a setting or function of the portable system 110, the processor 114 executes the instruction. For instructions for adjusting a setting or function of the host device 150, the processor 114 sends the instruction or message to the host device 150. The operation is indicated by reference numeral 216 in FIG. 2, with the communication channel and the communication being indicated by 217.

In embodiments, the processing hardware device 154 of the host device 150, executing, for instance, the dynamic programming language 164 also captures user inputs, for example, touches, gestures and speech received by way of a machine-user interface 172, translates them to data streams—e.g., byte streams—and then sends them to the portable system 110 through connection 129 or 131, for example.

In various embodiments, the processor 114 receives, e.g., by way of the wireless communication component 130, a communication, such as an instruction or message from the host device 150. The operation is also indicated by reference numeral 216 in FIG. 2, with the communication channel and the communication being indicated by 217. The transfer 217 is an example of data transfer by way of a second, or back channel of the bidirectional arrangement. Back-channel communications can be, but is not in every implementation, initiated by user input to the portable system 110.

Communications 217 from the host device 150 can take any of a variety of forms, such as by being configured to indicate a function, parameter, or setting of the portable system 110. The communication 217 can indicate a manner by which to establish the function, parameter or setting at the portable system 110, or to alter such previously established at the portable system 110.

In various embodiments, the portable system 110 can be personalized, such as by settings or user preferences. These can be programmed to the portable system 110 by any of a variety of methods, including by way of the host device 150, a personal computer (now shown), a mobile phone, or the like. In some embodiments, default settings or preferences are provided before any personalization is performed. The settings or preferences for personalization can include any of those described herein, such as a manner by which incoming video is processed—e.g., a size of equal-sized image snippets, a speed or quality of reading or writing, which can affect other processes (e.g., making available bandwidth for a VOIP call), or video-viewing experience, such as playback qualities at the host device 150.

While the setting can take other forms without departing from the scope of the present technology, in one embodiment the setting is selected from a group consisting of a quality of the image components and a playback setting. Example image quality characteristics include a level of zoom, brightness, or contrast.

The playback characteristic can be a feature that affects speed or direction by which the video display rendered is being played, or whether played at all. The playback characteristics can include, for instance, fast-forward, rewind, pause, stop, play, or rate of video play. In various embodiments, the playback feature affects a manner by which data-content packages are delivered by the portable system 110 to the host device 150.

At block 218, user input is received at the processor 114 of the portable system 110 by way of one or more user input, or I/O interfaces 126 (FIG. 1). As mentioned, the portable system 110 in some embodiments includes the at least one HMI component 126, such as a button, knob, touch-sensitive pad (e.g., capacitive pad), or microphone, configured to detect user input provided by touch, sound, and/or by non-touch motion, e.g., gesture.

The interface component 126 can be used to affect such functions and setting or parameters of the one or both of the portable system 110 and the host device 150 based on user input.

Thus, the processor 114, executing code of the hardware storage device 112 can generate or identify at least one instruction or message. The instruction can take any of a variety of forms, such as by being configured to indicate a function, parameter, or setting, of the portable system 110, or to indicate a function, parameter, or setting, of the host device 150. The instruction can further indicate a manner by which to establish a function, parameter or setting of the portable system 110, or to alter such function, parameter or setting previously established.

The process 200 of FIG. 2 can end 219 or any portion of the process can be repeated.

II.B. HOST DEVICE SYSTEM OPERATIONS—FIGS. 3 AND 4

The algorithm 300 of FIG. 3 is described primarily from the perspective of the host system or device 150 of FIG. 1. As provided, the device 150 can include or be a part of a head unit, or on-board computer, of a transportation vehicle, such as an automobile, for example.

The host device 150 can be connected by wire or wirelessly to the potable system 110.

The algorithm 300 begins 301 and flow proceeds to the first operation 302 whereat the host device 150—i.e., the processor 154 thereof executing code stored at the device storage 152—is placed in communication with the portable system 110. Connecting with the portable system 110 can include connecting by the wired or wireless connection 129, 131, shown.

The connection of block 302 can include a handshake process between the host device 150 and the portable system 110, which can also be considered indicted by reference numeral 203 in FIGS. 2 and 3. The process at operation 302 establishes a channel by which data and communications such as messages or instructions, can be shared between the portable system 110 and the host device 150.

In embodiments, during this handshake process, meta index components 415 are also exchanged based on, for example, USB mass storage device protocol.

For embodiments in which both devices include a dynamic programming language, such as JavaScript, Java or a C/C++ programming language, the operation 302 can include a handshake routine between the portable system 110 and the host device 150 using the dynamic programming language.

Flow proceeds to block 304 whereat the processor 154 receives from the portable system 110 the data-content package 412 and corresponding meta-index package 414 shown in FIGS. 4 and 5. The transmission is referenced above in connection with the associated portable-system operation 214 of FIG. 2, and referenced by numeral 215.

Receipt 304 of communications can be made along a forward channel of the bidirectional or arrangement mentioned, by which communications can be sent in both direction between the portable system 110 and the host device 150, including in some implementations simultaneously.

As mentioned, the data-content package 412 and corresponding meta-index package 414 can be sent in a single communication or transmission or by more than one communication or transmission. The mechanism is referred to at times herein as a packet, though it may include more than one packet, stream, or file.

In another embodiment, mentioned above in connection with FIG. 2, each image component/meta index component pair is received at the processor 154 from the portable system 110 individually, in separate transmissions, instead of in a packet with other image component/meta index component pairs. This embodiment can be referred to as a single-image file arrangement or management, by way of example.

Again, the arrangement, involving transfer of one or more components (e.g., components 413) of data content (412) at a time and one or more corresponding components (e.g., components 415) of meta index (414), can be referred to as a multi-tiered arrangement, the meta index features being a first tier corresponding to the image data features being the second tier.

The transfer can be performed by wired connection or wireless connection, which are indicated schematically by reference numerals 129 and 131 in FIG. 1, and by numeral 416 in FIGS. 4 and 5.

At block 306, the processor 154 stores the data-content package 412 and the index package 414 received to a portion of memory 152 at the host device 150, such as in memory 152 associated with the dynamic-programming-language (e.g., JavaScript, Java or a C/C++ programming language) application framework 162. The data-content package 412, its constituent parts being the data snippets—e.g., image components 413, and the index package 414, and its constituent index components 415, are referenced in FIG. 4 by numerals 452, 453, 454, and 455, respectively, to indicate the new location (file sub-system 160) of the data, though the content and index can be the same as that received from the file sub-system 120 to the file sub-system 160.

The memory component including a dynamic-programming-language application framework, such as JavaScript, Java or a C/C++ programming language, referenced 162 in FIG. 1, is indicated by a second-level cache 456 in FIG. 4.

Continuing with the multi-tiered arrangement referenced, the storing 306 can include saving the data-content package 412 and the meta-index package 414 to a first-level cache of the memory 152, such as a first-level cache of the file sub-system 160.

As provided, in some embodiments, the operations include one or more real-time adjustment functions, referenced by numeral 307 in FIGS. 3 and 213 in FIG. 2. In the operation at block 213, the processor 114, executing system code, adjusts or manipulates a linkage relationship between the data-content package and the meta-index package in real time at the host system. The host device 150 can perform a similar real-time adjustment, at block 307, in addition to or instead of such adjustment at the portable system 110. The functions of block 307 can be like those described above in connection with block 213.

As provided, operations of the method 300 can be performed in any order, and operations can be combined to a single step, or separated into multiple steps. Regarding the storing operation 306, for instance, the storing can be performed in one or respective single steps corresponding to each package (data and index). The host device 150 can store the data-content package 452 and the meta-index package 454 to the storage device 152, in a single operation, for instance. And the packages 452, 454 can be part of the same packet, stream, or file, or transferred to the host device 150 by the portable system 110 separately.

Flow proceeds to block 308 whereat the processor 154 publishes the media of the received data package 412 for communication to a user, e.g., vehicle passenger, as a video matching the source video file or virtualized source video received by the portable system 110 (operation 204).

As mentioned, the host device 150 in some embodiments has stored in its storage device 152 code of a dynamic programming language 164, such as JavaScript, Java or a C/C++ programming language. The language in some implementations includes an application framework for facilitating image-processing functions of the host device 150. The programming language code can define settings for communications between the portable system 110 and the host device 150, such as parameters of one or more APIs, and/or the manner by which the image files are processed at the host device 150 to display render the resulting video for publishing to the user.

As provided, in embodiments, the processing hardware device 154, executing the dynamic programming language 164 also receives user-input data sent from the portable processor 114 executing the dynamic programming language 125 stored there.

The language can be used in operations of the host device 150, including image-processing—e.g., reading and display rendering, operations.

Publishing video at operation 308 comprises rendering the data of the image components $453_{1-N}$ according to an order of the meta index components $455_{1-N}$ of the corresponding meta-index package 454.

In embodiments, then, the operations include:
  data being streamed to the portable system 110—e.g., streaming video—is received to the portable system 110, such as from the framebuffer 411;
  image components $413_{1-N}$ corresponding to the streaming video received are written at the portable system to the portable file sub-system 120, yielding data-content packages 412 the image components are written according to respective pointers (write pointers $P_W$, which can also be referred to by $P_1$) of the meta-index package 414;
  index components 415 are written, at the portable system to the portable file sub-system 120, to include pointers to respective data components 413, yielding the meta-index package 414;
  the data-content packages and meta-index packages 412, 414 are transferred to the host-device file sub-system 160 at the host device 150, yielding the data-content and index packages 452, 454 consisting of the image components 453 and index components 455, respectively; and
  the image components 453 are read consecutively, one at a time, according to respective pointers (read pointers $P_R$, which can also be referred to by $P_2$) in the corresponding index 454.

These functions can be performed in a round-robin manner. The configuration of the present technology ensures that the write pointer ($P_W$, or $P_1$) is always one step ahead of the read pointer ($P_R$, or $P_2$)—i.e., ensures that $P_1$ always equals $P_2-1$.

If $P_1>P_2$, then images read at the host device (by the index 454 there) will not be valid, if $P_1=P_2$, there would be a read-write conflict, and if $P_1<P_2$ (e.g., $P_1<<P_2$), there would be a large latency in the video streaming.

To achieve the read-write arrangement described ($P_1=P_2-1$), conventional systems require relatively expensive, and corresponding software, for fine-timing synchronization between the host device and the portable system. Any frequency offset between clocks of the two apparatus (host device and portable system) would accumulate until $P_2-P_1$ does not equal to 1. The event-driven configuration of the present technology achieves the desired result in a much-more efficient manner.

As provided, this arrangement—including receiving a meta index of meta index components corresponding in order to image components for sequential display rendering—provides an efficient and effective form of synchronization without requiring expensive clock synchronizing. The processing of each image component 413 can be triggered by reading the corresponding index component 415. Each next index component (e.g., $415_2$) is read following processing of a prior image component (e.g., $413_1$), and points the processor 154 to read its corresponding image component (e.g., $413_2$). The synchronization can be referred to as event-based synchronization, whereby none of the image components will be processed out of order. The event-based synchronization obviates the need for expensive time or clock synchronization components.

The resulting video is transferred, by wire or wirelessly, to an output 172, such as a display or screen 174, such as an infotainment screen of an encompassing system 151 such as an automobile. The transfer is indicated by numeral 309 in FIG. 3.

At block 310, the host device 150 generates, identifies (e.g., retrieves), receives, or otherwise obtains instructions or messages, such as orders or requests for changing of a setting or function. Regarding instructions for adjusting a setting or function of the host device 150, the processor 154 executes the instruction. Regarding instructions for adjusting a setting or function of the portable system 110, the processor 154 sends the instruction or message to the portable system 110, as indicated by path 217.

In one implementation, at least one communication, other than those transmitting data-content packages 412 and corresponding meta-index packages 414, is shared between the portable system 110 and the host device 150.

In various embodiments, the processor 154 sents to the portable system 110 a communication, such as an instruction or message, from the host device 150. These potential transmissions are indicated by reference numeral 217 in FIGS. 2 and 3.

For embodiments allowing bidirectional communications, communications or data (e.g., image/index package) sent by the portable system 110 are transmitted along a forward channel of the connection to the host device 150, and communications sent by the processor 154 to the portable system 110 are transmitted along a back channel.

Communications 217 from the portable system 110 to the host device 150 can take any of a variety of forms, such as by being configured to indicate a function, parameter, or setting, of the host device 150. The communication 217 can further indicate a manner by which to establish a function, parameter or setting, or to alter such previously established at the host device 150.

While the setting can take other forms without departing from the scope of the present technology, in one embodiment the setting is selected from a group consisting of a quality of the image components and a playback setting. Example image quality characteristics include a level of zoom, brightness, or contrast. The playback characteristic can be a feature that affects speed or direction by which the video display rendered is being played, or whether played at all. The playback characteristics can include, for instance, fast-forward, rewind, pause, stop, play, or rate of video play.

Generation of communications 217 from the host device 150 to the portable system 110 can be triggered by user input to an input device 172. The input can include touch input to a touch-sensitive screen 174, for example, and/or audio input to a vehicle microphone 176, for instance.

Communications 217 from the host device 150 to the portable system 110 can take any of a variety of forms, such as by being configured to indicate a function, parameter, or setting, of the portable system 110. The communication 217 can further indicate a manner by which to establish a function, parameter or setting at the portable system 110, or to alter such previously established at portable system 110.

While a setting at the portable system 110 affected by a communication 217 from the host device 150, can take other forms without departing from the scope of the present technology, the communication 217 is in one embodiment configured to affect a manner by which the portable system 110 performs any of its operations described, such as a manner by which the portable system 110 divides the source video stream into image components 413, or generates the meta-index package 414.

The process 300 can end 313, or any portions thereof can be repeated, such as in connection with a new video or media, or with subsequent portions of the same video used to generate the first image components 413 and index components 415 at the portable system 110.

III. FIGS. 6 AND 7

FIG. 6 shows a time chart 600 including a timeline 602 indicating an event-based timing by which circular files (e.g., each data-content package 412/corresponding meta-index package 414 pair) are written and read. FIG. 7 shows a corresponding graph 700 indicating an amount by which consecutive circular files are read over time before a next file is written.

The teachings of FIGS. 6 and 7 together show a manner by which transmissions of the circular files 412 and their readings are synchronized on an event basis, instead of using an expensive clock synchronization arrangement.

The chart 600 shows, above the line 602, functions of the portable system 110, as referenced by bracket 604, and functions of the host device 150—e.g., vehicle head unit—below the line 602, as referenced by bracket 606.

In the host-device section 606, the chart 600 shows a plurality of circular-file-read-commencement points 608, 610, 612, 614, whereat the host device 150 commences reading respective circular files. Thus between each commencement point is a corresponding circular-file read, such as the read indicated by bracket 616 between the last two commencement points 612, 614 called out.

In various embodiments, at least one algorithm controlling when circular files are written controls the writings according to reading status of an immediately previous circular file. In one of the embodiments, the algorithm provides by a first, 'for,' thread:

for each $T_2$ (618 in FIG. 6):
    If the host device 150 sends a data reading request (e.g., a USB packet) to the portable system 110, then $U=C_0$;
    else (e.g., read does not occur), then $U=U-1$ (i.e., U is decremented by 1).
    [Thread 1]

And by a corresponding second, 'while,' thread:

while true:
    capture frame (e.g., image components); and
    when $\frac{1}{4}C_0 < U < \frac{3}{4}C_0$, write circular file,
    [Thread 2]

where $C_0$ represents the initial, complete circular file 412, before it is read at the host device 150. When one quarter of the circular file 412 has been read at the host device 150, then the amount of circular file 412 remaining at that point would be $\frac{3}{4}C_0$, and so on.

The fractions shown are only sample values. The fractions could have other values greater than 0 and less than 1. In practice, the values could be set otherwise by users, such as engineers. The setting can be made using a calibration process, such as one in which feedback from test or actual operation of the arrangement 100, or a component thereof, is processed for setting one or more of the values.

The first conditional (if) routine of the first thread [Thread 1] can be a part of the host device 150 reading the circular file, wherein the device 150 reads the data, such as from the portable system 110 in the form of a USB mass storage device, for example, sending a packet such as a USB packet to initiate the reading. By receiving the request from the host device 150, the portable system 110 determines that the reading has occurred or is occurring and can thereby determine a reading time for the file.

The graph 700 shows a timeline 702 along the x-axis, and along the y-axis, an amount of unread portion of the circular file (412 in FIGS. 4 and 5), which can be referred to by U. The graph 700 calls out five (5) primary U values:

(1) a lowest value, $U=0$, at the x-axis;
    (2) a top-most value 706 on the y-axis 704, or $U=C_0$;
    (3) a three-quarters value 708, or $U=\frac{3}{4}C_0$;
    (4) a halved value 710, or $U=\frac{1}{2}C_0$); and
    (5) a one-quarter value 712, or $U=\frac{1}{4}C_0$.

The fractions shown are only sample values. The fractions could have other values greater than 0 and less than 1. In practice, the values could be set otherwise by users, such as engineers. The setting can be made using a calibration process, such as one in which feedback from test or actual operation of the arrangement 100, or a component thereof, is processed for setting one or more of the values.

The line 701 shows the amount of circular file left throughout reads at the host device 150 of adjacent circular files. The full content of each circular file has an initial maximum value, where the line 701 starts in each section, corresponding to respective circular file reads, at the highest U value 706, or $C_0$. As each circular file is read, the unread, or U, value, decreases over time, as shown for each read by its descending portion of the line 701.

In the example shown, line 701 is not perfectly symmetric (e.g., it dips below the x-axis, once). This is because intervals between consecutive readings (represented by numeral 616 in FIG. 6) may vary over time. This would be due mainly to a non-real-time nature of programmable languages such as JavaScript. This characteristic adds phase offset between the clocks of the portable system 110 and the host device 150. There is also inherent frequency offset in any distributed system. Both slight frequency and phase offsets are tolerated by the present technology, being accounted for, or absorbed, by the algorithm—reference, for instance, operation of the first thread [Thread 1], above.

New circular files are written—e.g., generated at the portable system 110 and sent to the host device 150—according to the threads [Thread 1], [Thread 2] described above in connection with FIG. 6. Accordingly, a new circular file is written when an immediately previous circular file has been about half read 710—in one embodiment the writing of a next circular file occurs when the unread portion (or the read portion) of the circular file is between three quarters 708 and one quarter 712 of the original total circular file ($C_0$).

In this way, one circular file is sent at a time, and a next circular file is being received at the host device 150 at the time that the host device is completing reading the immediately preceding circular file. And the next circular file can be read, starting with a first image component (e.g., $413_1$) of a next circular file $412_F$, immediately after a final image component (e.g., $413_N$) of the immediately preceding circular file $412_{F-1}$ is read.

V. SELECT BENEFITS OF THE PRESENT TECHNOLOGY

Many of the benefits and advantages of the present technology are described above. The present section restates some of those and references some others. The benefits are provided by way of example, and are not exhaustive of the benefits of the present technology.

The technology allows transfer and real-time display of video data in an efficient and synchronized manner between connected devices without need for expensive time synchronization practices. The synchronization is event-based instead of based on synchronized timing.

The systems and algorithms described can be used to transfer high-speed video streams by way of relatively low-transfer-rate connections, such as a USB connection.

The present technology in at least these ways solves prior challenges to transferring and displaying in real time high-throughput media from a source, such as a remote server, to a destination host device, such as an automotive head unit, without need for expensive time synchronization software or hardware, and without requirements for relatively expensive high-end wireless-communications and graphics-processing hardware at the host device.

The portable systems allow streaming of video data at a pre-existing host device, such as an existing automotive on-board computer in a legacy or on-road vehicle—e.g., a vehicle already in the marketplace.

As another benefit, the capabilities can further be provided using a portable system to include mostly, or completely, parts that are readily available and of relatively low cost.

VI. CONCLUSION

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A portable system, enabling event-based synchronization for real-time video streaming, comprising:
   a processing hardware unit; and
   a non-transitory storage device comprising computer-executable code that, when executed by the processing hardware unit, causes the processing hardware unit to perform operations comprising:
      receiving from a video source, a source video file or a virtualized source video;
      dividing the source video file or virtualized source video into a plurality of immediately-preceding image components and next image components, yielding respectively an immediately-preceding data-content package and a next data-content package;
      sending, from the portable system to a host device, an immediately-preceding data-content package/meta-index package pair comprising the immediately-preceding data-content package and a corresponding immediately-preceding meta-index package, for publishing of image components of the immediately-preceding data-content package, sequentially at the host device, in accord with an order of the immediately-preceding meta-index package, for real-time display rendering of streaming video, corresponding to the source video file or the virtualized source video, by way of the host device and a display component;
      determining an amount of the immediately-preceding data-content package read at the host device, yielding a determined read amount;
      generating a next data-content package/meta-index package pair comprising a next meta-index package having a plurality of next index components, each next index component corresponding to a respective one of the image components of the next data-content package; and
      sending the next data-content package/meta-index package pair from the portable system to the host device for publishing of the image components, of the next data-content package, sequentially at the host device, in accord with an order of the next meta-index package, for real-time display rendering of streaming video, corresponding to the source video file or virtualized source video, by way of the host device and the display component;

wherein the generating and the sending operations are performed according to a write-timing algorithm comprising as a variable, for determining when to write and send, to the host device, the next data-content package/meta-index package pair, the determined read amount of the immediately-preceding data-content package read at the host device.

2. The portable system of claim 1 wherein the operation of dividing the source video file or the virtualized source video into the plurality of components comprises dividing the source video file or the virtualized source video into equal-sized image components, yielding the immediately-preceding data-content package and the next data-content package.

3. The portable system of claim 1 wherein the video source comprises a screen framebuffer of another device.

4. The portable system of claim 1 wherein:
generating the next data-content package/meta-index package pair yields a linkage relationship between the next data-content package and the next meta-index package in real time at the remote portable system; and
the operations further comprise, subsequent to generating the next data-content package/meta-index package pair, adjusting the linkage relationship between the next data-content package and the next meta-index package in real time at the remote portable system.

5. The portable system of claim 1 wherein:
with $C_0$ indicating an amount of the immediately-preceding data-content package yet read at the host device, the write-timing algorithm is represented as follows:
(a) if the immediately-preceding data-content package is being read at the host device, then an unread-portion variable (U) is $C_0$;
(b) else, U=U−1; and
(c) repeat (a) and (b) until $(F_1)C_0 < U < (F_2)C_0$, and at which time write the next content package/meta-index package pair;
$F_1$ is a first fraction greater than 0 and less than 1; and
$F_2$ is a second fraction greater than $F_1$ and less than 1.

6. The portable system of claim 1 wherein the operations further comprise:
receiving an instruction sent by the host device; and
altering a setting at the portable system according to the instruction.

7. The portable system of claim 6 wherein the portable system is configured for simultaneous bidirectional communications with the host device via a forward channel, by which the data-content packages and corresponding meta-index packages are sent by the processing hardware unit to the host device, and a back channel by which the instruction sent by the host device is received at the processing hardware unit.

8. The portable system of claim 6 wherein the setting is selected from a group consisting of a quality of the image components and a playback setting affecting a manner by which the data-content packages are delivered by the portable system to the host device.

9. The portable system of claim 1 wherein the computer-executable code comprises instructions configured according to a dynamic programming language to facilitate interactions with the host device also comprising the dynamic programming language.

10. The portable system of claim 1 further comprising a human-machine interface connected to the processing hardware unit, wherein the operations further comprise:
receiving a user-input signal by way of the human-machine interface; and
performing, based on the user-input signal, at least one system-programming routine selected from a group consisting of:
establishing a setting and storing the setting to the non-transitory storage device; and
altering a setting previously stored at the portable system.

11. The portable system of claim 1 wherein the operations further comprise generating, based on the source video file or virtualized source video, a subsequent data-content package and a corresponding subsequent meta-index package associated with the subject video, and sending, to the host device, the subsequent data-content package for sequential publishing of content of the subsequent data-content package in accord with an order of the subsequent meta-index package for display rendering via the computer as streaming video, following streaming video display rendered based on the next data-content package/data-index package pair.

12. The portable system of claim 1 wherein:
the host device is a part of an automobile comprising a universal serial bus (USB) port;
the portable system comprises a corresponding USB plug for mating with the automobile; and
the computer-executable code comprises a USB mass-storage-device-class computing protocol for use in sending the data-content packages and the meta-index packages to the portable system also having the USB mass-storage-device-class computing protocol.

13. A host system, enabling event-based synchronization for real-time video streaming, comprising:
a processing hardware unit; and
a non-transitory storage device comprising computer-executable code that, when executed by the processing hardware unit, cause the processing hardware unit to perform operations comprising:
receiving, from a portable system, a first data-content package comprising first image components generated at the portable system based on a source video file or virtualized source video;
receiving, from the portable system, a first meta-index package comprising a plurality of first index components, each first index component corresponding to a respective one of the first image components;
publishing in real-time, to a display component in communication with the processing hardware unit, the first image components sequentially, in accord with an order of the first index components, for display rendering streaming video corresponding to the source video file or virtualized source video;
sending, to the portable system, following commencement of said publishing, a communication indicating an amount of the first data-content package read at the host system, for enabling the portable system to use a write-timing algorithm comprising as a variable, for determining when to write and send, to the host device, a second data-content package/meta-index package pair, the amount of the first data-content package read, in a portable-system second-package write/send decision;
receiving, from a portable system sending in response to the portable-system second-package write/send decision, the second data-content package/meta-index package pair having second image components and corresponding second index components and being generated at the portable system based on the source video file or virtualized source video; and publishing in real-time, to the display component, the second image components sequentially, in accord with an order of the second index components, for display rendering streaming video corresponding to the source video file or virtualized source video.

14. The host system of claim 13 wherein the operations further comprise adjusting a linkage relationship between the first data-content package and the first meta-index package in real time at the host system.

15. The host system of claim 13 wherein:
the non-transitory storage device comprises a first-level cache and a second-level cache;
the operations further comprise storing the first data-content package and the first meta-index package to the first-level cache; and
at least a portion of the computer-executable code constitutes an application stored at the second-level cache and used in performance of the publishing operation.

16. The host system of claim 13 further comprising, or being communicatively connected to, a human-machine interface connected to the processing hardware unit, wherein the operations further comprise:
receiving, by way of the human-machine interface, a user-input signal; and
sending, in response to the user-input signal, an instruction to the portable system.

17. The host system of claim 16 wherein the host system is configured for simultaneous bidirectional communications with the portable system via a forward channel, by which the first data-content package and the first meta-index package are received at the processing hardware unit, and a back channel by which the instruction is sent by the processing hardware unit to the portable system.

18. The host system of claim 16 wherein the instruction sent is configured to initiate at the portable system a function selected from a group consisting of:
establishing a user-personalization setting and storing the user-personalization setting to the portable system;
altering a user-personalization setting stored at the portable system; and
altering a functional characteristic of the portable system.

19. The host system of claim 18 wherein the functional characteristic is selected from a group consisting of a quality of image components, including the first and second image components, and a playback feature affecting a manner by which data-content packages are delivered by the portable system to the host system.

20. The host system of claim 13 wherein:
the host system is configured for implementation as a part of an automobile comprising a universal serial bus (USB) port;
the portable system comprises a corresponding USB plug for mating with the automobile; and
the computer-executable code comprises a USB mass-storage-device-class computing protocol for use in receiving the first data-content package and the first meta-index package from the portable system also having the USB mass-storage-device-class computing protocol.

21. The host system of claim 13 wherein the computer-executable code comprises instructions configured according to a dynamic programming language to facilitate interactions with the portable system being programmed with code also configured according to the dynamic programming language.

22. The host system of claim 13 wherein:
the communication is sent to trigger delivery from the portable system to the host system of a second data-content package and a second meta-index package, the second data-content package comprising second image components, based on the source video file or virtualized source video, and the second meta-index package comprising second index components, each second index component corresponding to a respective one of the second image components; and
the operations further comprise publishing, by way of the display component, the second image components of the second data-content package sequential in accord with an order of the second meta-index package for display rendering streaming video at the display component.

23. A non-transitory storage device, for use at a portable system for event-based synchronization in real-time video streaming in connection with a host device, comprising computer-executable code that, when executed by a processing hardware unit, causes the processing hardware unit to perform operations comprising:
receiving from a video source, a source video file or a virtualized source video;
dividing the source video file or virtualized source video into a plurality of immediately-preceding image components and next image components, yielding respectively an immediately-preceding data-content package and a next data-content package;
sending, from the portable system to a host device, an immediately-preceding data-content package/meta-index package pair comprising the immediately-preceding data-content package and a corresponding immediately-preceding meta-index package, for publishing of image components of the immediately-preceding data-content package, sequentially at the host device, in accord with an order of the immediately-preceding meta-index package, for real-time display rendering of streaming video, corresponding to the source video file or virtualized source video, by way of the host device and a display component;
determining an amount of the immediately-preceding data-content package read at the host device, yielding a determined read amount;
generating a next data-content package/meta-index package pair comprising a next meta-index package having a plurality of next index components, each next index component corresponding to a respective one of the image components of the next data-content package; and
sending the next data-content package/meta-index package pair from the portable system to the host device for publishing of the image components, of the next data-content package, sequentially at the host device, in accord with an order of the next meta-index package, for real-time display rendering of streaming video, corresponding to the source video file or virtualized source video, by way of the host device and the display component;
wherein the generating and the sending operations are performed according to a write-timing algorithm comprising as a variable, for determining when to write and send, to the host device, the next data-content package/meta-index package pair, the determined read amount of the immediately-preceding data-content package read at the host device.

24. The non-transitory storage device of claim 23 wherein the operation of dividing the source video file or virtualized source video into a plurality of components comprises dividing the source video file or virtualized source video into equal-sized image components, yielding the immediately-preceding data-content package and the next data-content package.

25. The non-transitory storage device of claim 23 wherein the video source comprises a screen framebuffer of another device.

26. The portable system of claim 6 wherein the setting comprises a quality of the first and second image components.

27. The host system of claim 18 wherein the functional characteristic comprises a quality of the first and second image components.

28. The non-transitory storage device of claim 23 wherein:
   the operations further comprise:
      receiving an instruction sent by the host device; and
      altering a setting at the portable system according to the instruction; and
   the setting comprises a quality of the first and second image components.

* * * * *